United States Patent
Chen et al.

(10) Patent No.: US 10,521,418 B2
(45) Date of Patent: Dec. 31, 2019

(54) ENFORCING TEMPORAL REFERENTIAL INTEGRITY

(71) Applicant: International Business Machines Corporation, Armonk, NY (US)

(72) Inventors: Yao-Ching S. Chen, Saratogo, CA (US); Xiaohong Fu, Milpitas, CA (US); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 15/240,079

(22) Filed: Aug. 18, 2016

(65) Prior Publication Data
US 2018/0052880 A1    Feb. 22, 2018

(51) Int. Cl.
*G06F 16/23* (2019.01)
*G06F 17/30* (2006.01)

(52) U.S. Cl.
CPC ............... *G06F 16/2365* (2019.01)

(58) Field of Classification Search
None
See application file for complete search history.

(56) References Cited

U.S. PATENT DOCUMENTS

| | | | |
|---|---|---|---|
| 6,098,075 A | 8/2000 | Becraft et al. | |
| 6,502,092 B1 | 12/2002 | Ensor | |
| 7,870,174 B2 | 1/2011 | Eadon et al. | |
| 7,949,640 B2 | 5/2011 | Holenstein et al. | |
| 8,219,522 B2 | 7/2012 | Johnston et al. | |
| 8,396,860 B1 | 3/2013 | Ramesh et al. | |
| 8,892,515 B2 | 11/2014 | Lyle et al. | |
| 2004/0236744 A1 | 11/2004 | Desai et al. | |

FOREIGN PATENT DOCUMENTS

EP    2251802 A1    11/2010

OTHER PUBLICATIONS

Nicola et al. Jul. 2012. Managing time in DB2 with temporal consistency. IBM.*

(Continued)

*Primary Examiner* — Tuankhanh D Phan
(74) *Attorney, Agent, or Firm* — North Shore Patents, P.C.; Michele Liu Baillie

(57) ABSTRACT

In an enforcement of temporal referential integrity in a database system, the database system receives a change request for one or more rows in a target table in the database system. The system determines that the target table has temporal referential constraints with a second table. The system compares a non-period child key value in child table row(s) with a non-period parent key value in parent table row(s) and compares a child business time period key value in the child table row(s) with a parent business time period key value in the parent table row(s). When the non-period child key value matches the non-period parent key value and when the child business time period key value is within the parent business time period key value, the system determines that the change request satisfies the temporal referential constraints. Otherwise, the system determines that the change request violates the temporal referential constraints.

10 Claims, 10 Drawing Sheets

(56) References Cited

OTHER PUBLICATIONS

Johnston et al. 2010. Managing Time in Relational Databases. Elsevier Inc. pp. 349-379.*
Mozhgan Memari, et. al., "Index Design for Enforcing Partial Referential Integrity Efficiently", 18th International Conference on Extended Database Technology (EDBT), pp. 217-228, Mar. 23-27, 2015, Brussels, Belgium.
List of IBM Patents or Patent Applications Treated as Related.

* cited by examiner

Parent dept Table 1001

| DNo | DStart | DEnd | DName |
|---|---|---|---|
| 3 | 2009-01-01 | 2010-01-01 | Test |
| 3 | 2009-01-01 | 2011-12-31 | QA |
| 4 | 2009-06-01 | 2011-12-31 | Development |

Child emp Table 1002

| ENo | EStart | EEnd | EDept |
|---|---|---|---|
| 22218 | 2009-05-01 | 2010-02-03 | 3 |
| 22218 | 2011-06-03 | 2011-11-12 | 4 |

1004

Child emp Table 1003

| ENo | EStart | EEnd | EDept |
|---|---|---|---|
| 22218 | 2009-05-01 | 2010-02-03 | 3 |
| 22218 | 2011-07-01 | 2011-08-01 | 3 |
| 22218 | 2011-06-03 | 2011-07-01 | 4 |
| 22218 | 2011-08-01 | 2011-11-12 | 4 |

1005
1006
1007

ENFORCING TEMPORAL REFERENTIAL INTEGRITY

BACKGROUND

Some database systems support temporal data management. Temporal tables differ from regular base tables in that temporal tables contain the "period" concept. In relational database systems, a period is represented by a pair of columns: the start column stores the start time of the period, and the end column stores the end time of the period. Temporal tables may contain different types of periods, such as a system time period, which is controlled by the database system, and a "business time period", which is controlled by an application. Business time is sometimes referred to as "valid time" or "application time." The values of the business time, i.e., the business start time and business end time, are provided by the users, and the business time tracks when the data is deemed valid in reality. For example, the business validity of data can be indicated by assigning a pair of date or timestamp values to the business time period of a row to indicate when the information is deemed valid. Rows in temporal tables can be inserted, updated, deleted, and queried using standard syntax. Referential integrity is the state in which all values of all foreign keys are valid. Regular, or non-temporal, referential constraint requires every row in a child table with non-null foreign key value to have one corresponding row in a parent table with a matching key value. However, database systems currently offer no mechanisms for enforcing temporal referential constraints for temporal tables with business time periods. For example, an administration system may need to ensure that every employee at every point in time during his or her employment belongs to a department that actually exists at that point. One possible approach is to build application logic to define and enforce the business rules that involve temporal referential integrity. However, this approach leads to more application complexity, places a burden on application developers, and negatively impacts the performance of the database system.

SUMMARY

Disclosed herein is a method for enforcing temporal referential integrity and a computer program product as specified in the independent claims. Embodiments of the present invention are given in the dependent claims. Embodiments of the present invention can be freely combined with each other if they are not mutually exclusive.

According to an embodiment of the present invention, in an enforcement of temporal referential integrity in a database system, the database system receives a change request for one or more rows in a target table in the database system. The system determines that the target table has temporal referential constraints with a second table. The system compares a non-period child key value in child table row(s) with a non-period parent key value in parent table row(s) and compares a child business time period key value in the child table row(s) with a parent business time period key value in the parent table row(s). When the non-period child key value matches the non-period parent key value and when the child business time period key value is within the parent business time period key value, the system determines that the change request satisfies the temporal referential constraints. Otherwise, the system determines that the change request violates the temporal referential constraints.

DETAILED DESCRIPTION

Temporal referential constraints may be defined between one or more child tables and one or more parent tables with business time periods. To satisfy the temporal referential constraint, for every row in a child table, one or more corresponding rows in a parent table must exist with a matching key value, and the business time period(s) of the parent table row(s) must completely cover the business time period of the child table row without gaps. In the illustrative embodiments herein, a temporal referential constraint is satisfied if: (1) every non-null value of the child/foreign key matches a value of the parent/primary key; and (2) the business time period value in the child table is contained in the business time period in the parent table that is represented by the union of the business time periods of one or more contiguous matching rows in the parent table.

Figure 1:
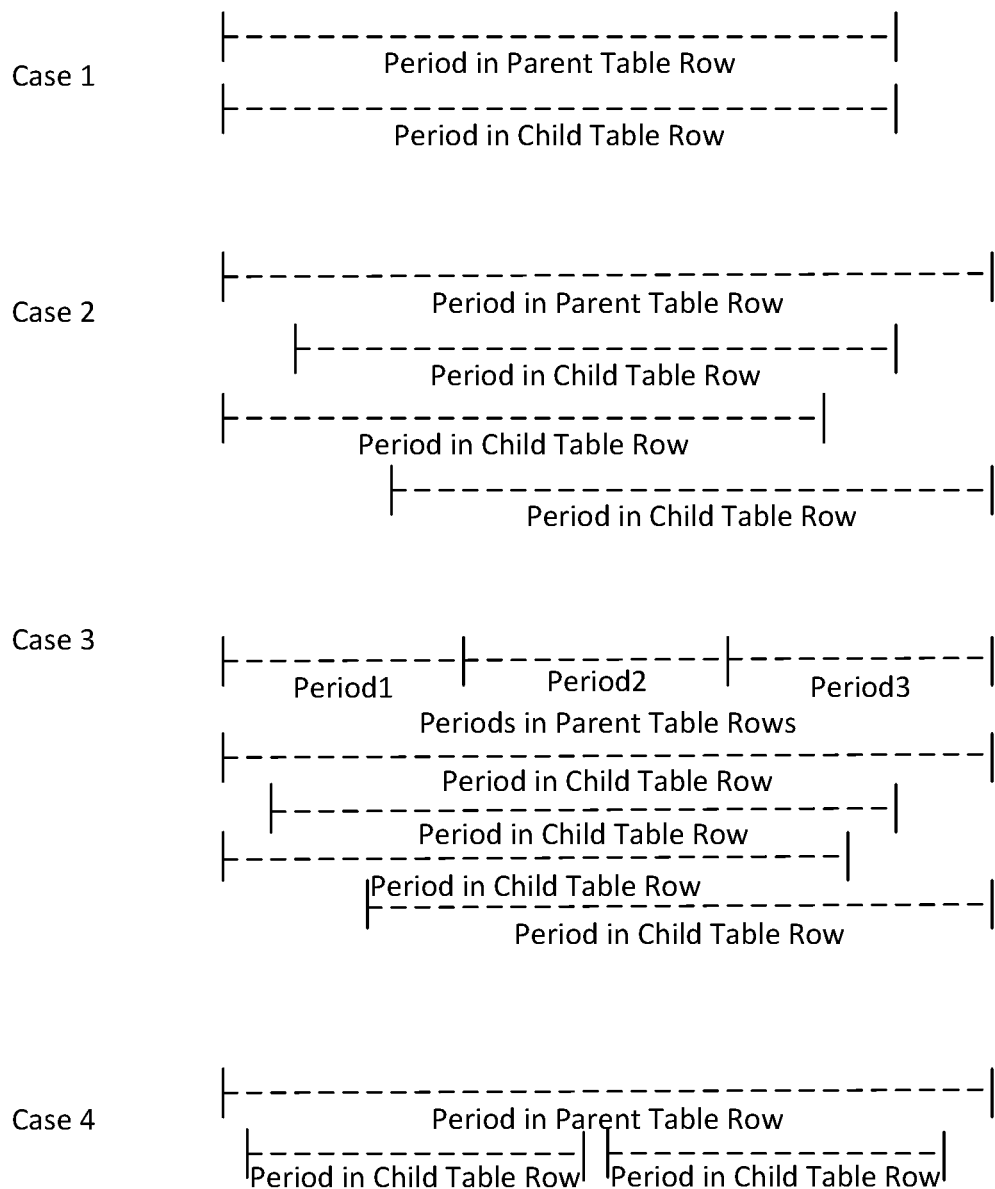
FIG. 1 illustrates example cases that meet the criteria for a temporal referential constraint, according to embodiments of the present invention.

FIG. 1 illustrates example cases that meet the criteria for a temporal referential constraint, according to embodiments of the present invention. In Case 1, the business time period in the parent table row and the child table row are the same. In Case 2, the business time period in the parent table row either starts before and ends after the period in the child table row, starts at the same point but ends after the period in the child table row, or starts before but ends at the same point as in the child table row. Unlike a non-temporal referential constraint, for a temporal referential constraint, it is possible that the business time period of the child table row will be contained in the time period represented by multiple contiguous rows of the parent table. The business time period of multiple rows in the parent table together can logically cover the period in the child table, without any "gaps". In Case 3, the business time period values of the parent table rows are "contiguous", and the child periods either totally or partially overlap the contiguous business time period in the parent table rows. In Case 4, it is also possible that the business time period of multiple rows in the child table may be contained in the business time period of a single row in the parent table.

As illustrated above, when the business time period value in the child table is contained in the business time period of the parent table represented by the union of multiple matching rows in the parent table, there must be no "gaps" in the composite period in the parent table. How a "gap" is detected depends on the semantic model used for the business time periods. In the illustrated embodiments of the present invention, there are two possible semantic models for the business time periods:

Inclusive-exclusive model: a gap does not exist if the end of the business time period of one row equals the begin value of the business time period of another row; and Inclusive-inclusive model: a gap does not exist if the end of the business time period of one row plus one unit of time equals the begin value of the business time period of another matching row. The unit of time value depends on the data type of the business time period. For example, for period columns defined as DATE data type, the unit of time is one day, and for period columns defined as TIMESTAMP(6) data type, the unit of time is one microsecond.

To support temporal referential integrity on business time, the temporal referential constraint is first defined between one or more parent tables and one or more child tables using data definition language (DDL). In an illustrative embodiment, a new syntax fragment, PERIOD BUSINESS_TIME is added to CREATE TABLE and ALTER TABLE DDL statements. Both the parent and child tables must be temporal tables with business time periods. For example, a parent "dept" table and a child "emp" table may be defined as follows:

```
CREATE TABLE dept
(DNo INTEGER NOT NULL,
DStart DATE NOT NULL,
DEnd DATE NOT NULL,
DName VARCHAR(30),
PERIOD BUSINESS_TIME (DStart, DEnd),
PRIMARY KEY (DNo, BUSINESS_TIME
WITHOUT OVERLAPS)) IN DB.TS1;
CREATE TABLE emp
(ENo INTEGER NOT NULL,
EStart DATE NOT NULL,
EEnd DATE NOT NULL,
EDept INTEGER,
PERIOD BUSINESS_TIME (EStart, EEnd),
FOREIGN KEY (EDept, PERIOD BUSINESS_TIME)
REFERENCES dept (DNo, PERIOD BUSINESS_TIME)
IN DB.T52;
```

For a temporal referential constraint, the parent table must have a unique index defined with the BUSINESS_TIME WITHOUT OVERLAPS clause, referred to herein as a primary key index. The primary key index ensures that the values for the rest of the specified keys are unique with respect to any period of time. Additionally, a non-unique index must be defined on the child table with the BUSINESS_TIME WITH OVERLAPS clause, referred to herein as a foreign key index, or an equivalent index that explicitly references the columns of the business time period. The last two columns of the primary key and foreign key indexes must be the end time and the begin time columns of the business time period. For example, the indexes on the parent table and the child table may be defined as follows:

```
CREATE UNIQUE INDEX dept_primary_key_ix
ON dept (DNo, BUSINESS_TIME
WITHOUT OVERLAPS);
CREATE INDEX emp_foreign_key_ix ON emp
(EDept, BUSINESS_TIME WITH
OVERLAPS);
```

The primary and foreign keys thus contain a non-period key for the non-temporal columns and a business time period key (or period key) for the end and begin time columns.

Figure 2:
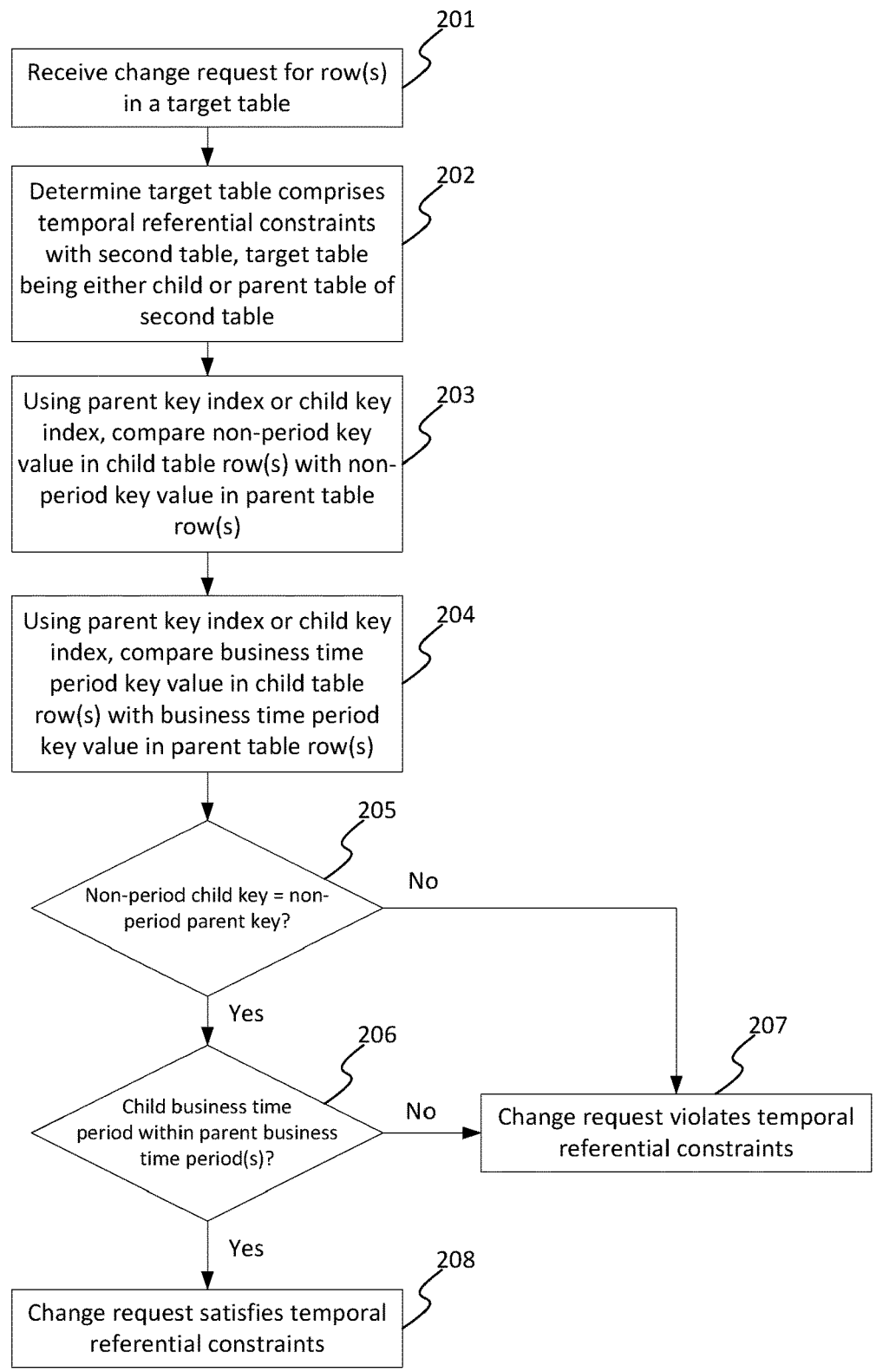
FIG. 2 illustrates a method for enforcing temporal referential integrity in a database system according to embodiments of the present invention.

FIG. 2 illustrates a method for enforcing temporal referential integrity in a database system according to embodiments of the present invention. When a change request for one or more rows in a target table is received (201), the database system determines whether the target table comprises temporal referential constraints with a second table, where the target table is either a child or a parent table of the second table (202). When the target table comprises temporal referential constraints with the second table, the database system compares the non-period key value in the child table row(s) with the non-period key value in the parent table row(s) (203). The database system further compares the business time period key value in the child table row(s) with the business time period key value in the parent table row(s) (204). If the non-period child key value does not match the non-period parent key value (205), or if the child business time period is not within the parent business time period (206), then the change request violates the temporal referential constraints (207), and the database system fails the change request. If the non-period child key value matches the non-period parent key value (205), and the child business time period is determined to be within the parent business time period (206), then the change request satisfies the temporal referential constraints (208).

Figure 3:
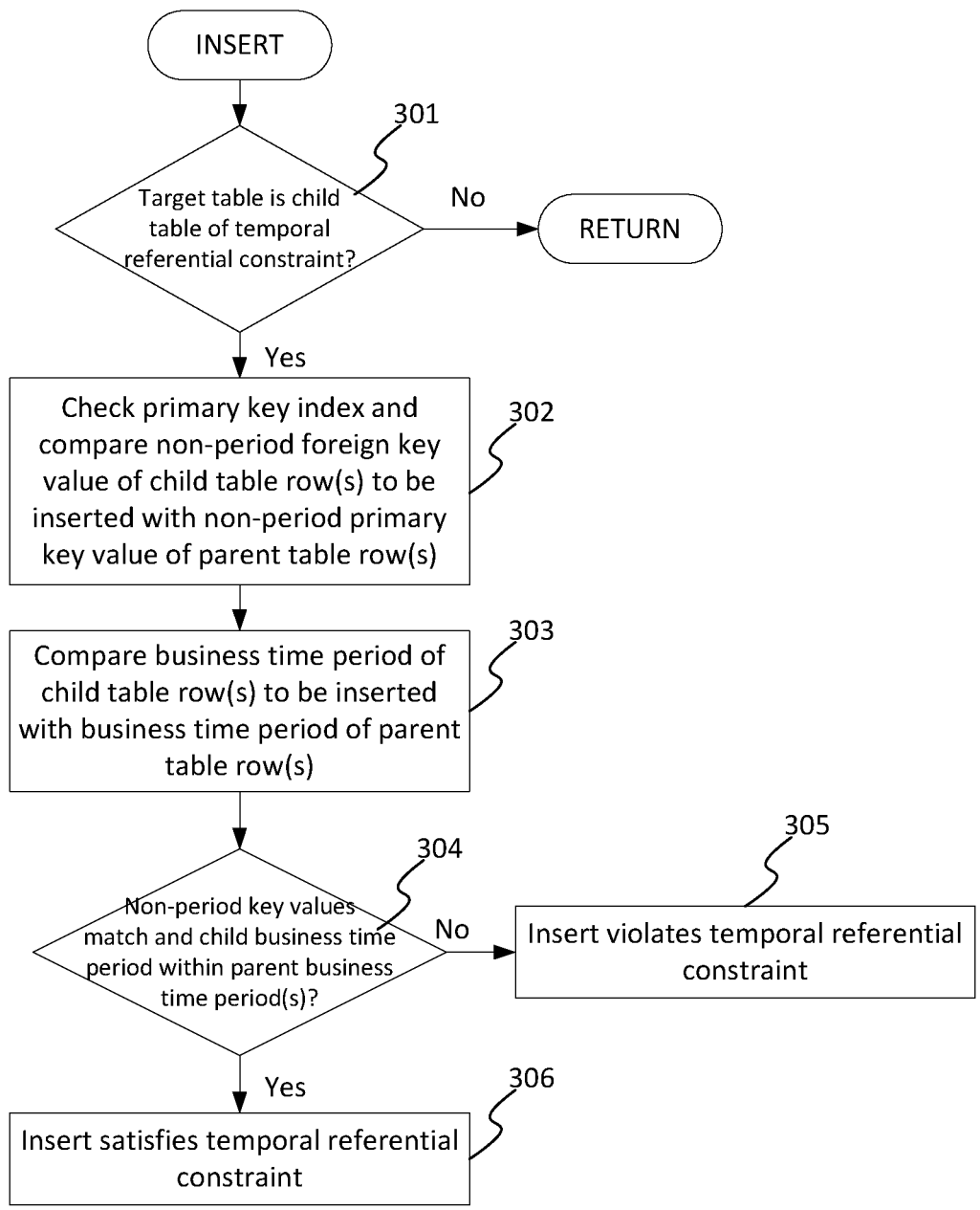
FIG. 3 illustrates an embodiment of the enforcement of temporal referential integrity for an INSERT operation to insert one or more rows into a target table.

FIGS. 3-9 illustrate in more detail the method for enforcing temporal referential integrity in a database system according to embodiments of the present invention. FIG. 3 illustrates an embodiment of the enforcement of temporal referential integrity for an INSERT operation to insert one or more rows into a target table. When the change request is an INSERT operation, the database system determines whether the target table is a child table of a temporal referential constraint with a parent table (301). If not, then temporal referential constraint checking is not needed. If so, then the database system checks the primary key index and compares the non-period foreign key value of the child table row(s) to be inserted with the non-period primary key value of the parent table row(s) (302). The database system also compares the business time period of the child table row(s) to be inserted with the business time period of the parent table row(s) (303). If the non-period foreign key value of the child table row(s) matches the non-period primary key value of the parent table row(s), and the business time period of the child table row(s) is within the parent business time period of the parent table row(s) (304), then the INSERT satisfies the temporal referential constraint (306). Otherwise, the INSERT operation violates the temporal referential constraint (305), and the database system fails the INSERT operation.

Figure 4:
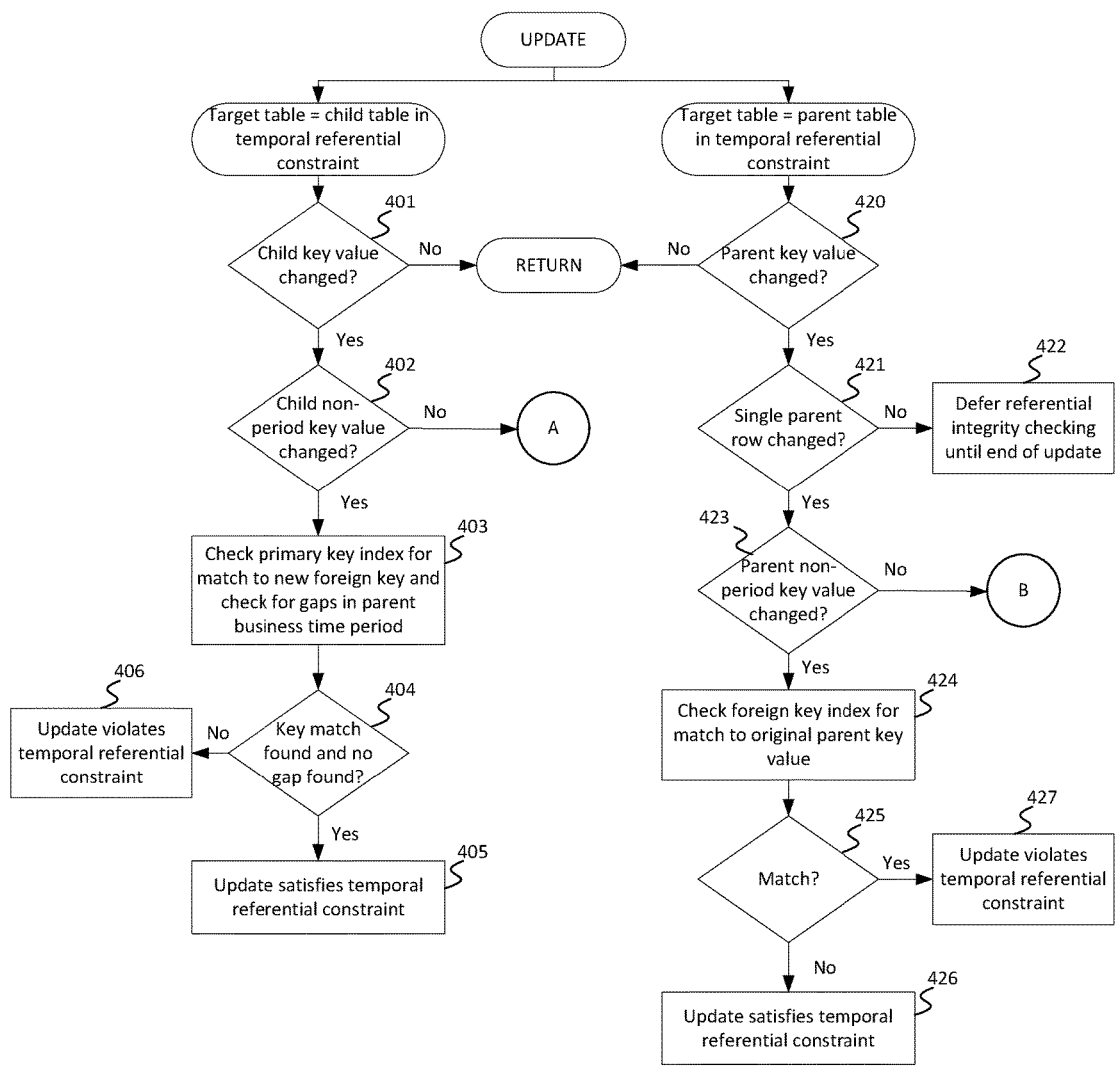
FIGS. 4-6B illustrate an embodiment of the enforcement of temporal referential integrity for an UPDATE operation according to the present invention.

FIGS. 4-6B illustrate an embodiment of the enforcement of temporal referential integrity for an UPDATE operation according to the present invention. Referring to FIG. 4, when the change request is an UPDATE operation to update the value of column(s) in one or more rows of a target table, the database system determines whether the target table is a child table or a parent table in a temporal referential constraint. When the target table is a child table in the temporal referential constraint, the database system determines whether the child key value is changed by the UPDATE operation (401). If the child key value is not changed, then temporal referential integrity checking is not required. If the child key value is changed, then the database system determines whether the non-period child key value is changed (402). If the child non-period key value is changed, then the database system checks the primary key index for a match between the primary key value(s) and the new foreign key value(s) of the updated child table row(s) and checks for gaps in the parent business time period (403). If the primary key value(s) match the new foreign key value(s) and there are no gaps in the parent business time period, then the UPDATE satisfies the temporal referential constraint (405). Otherwise, the UPDATE operation violates the temporal referential constraint (406), and the database system fails the UPDATE operation.

Figures 5A, 6A:
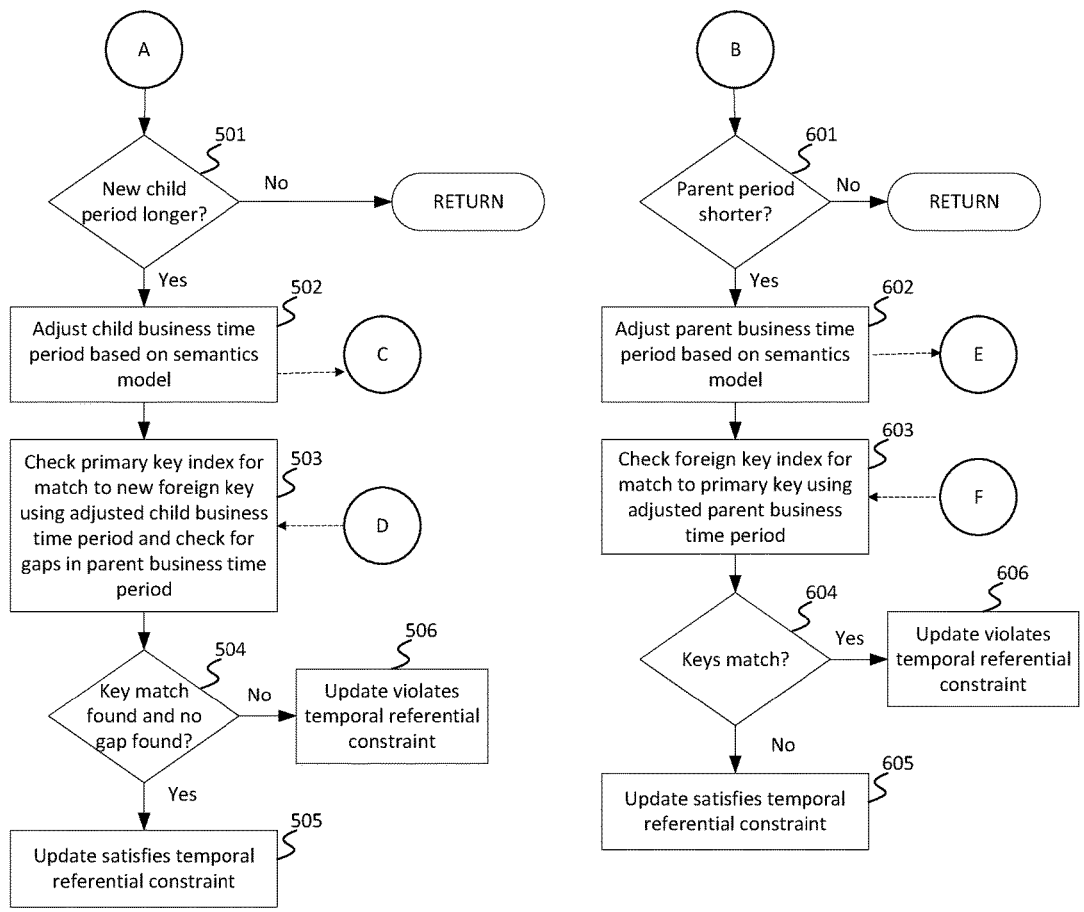

If the non-period child key value is not changed (402), then the child period key value must be modified by the UPDATE operation. Referring to FIG. 5A, when the child period key value is modified, the child business time period can be modified to the shorter or longer. When the database system determines that the child business time period is not modified to be longer (501), then the temporal referential integrity checking is not required, since the new child business time period will be within the parent business time period. When the child business time period is modified to be longer (501), then temporal referential integrity checking is required, since there is a possibility that the new child business time period will not be within the parent business time period. To perform the temporal referential integrity checking, in this illustrative embodiment, the database system first adjusts the child business time period based on the semantics model used (502).

Figure 5B:
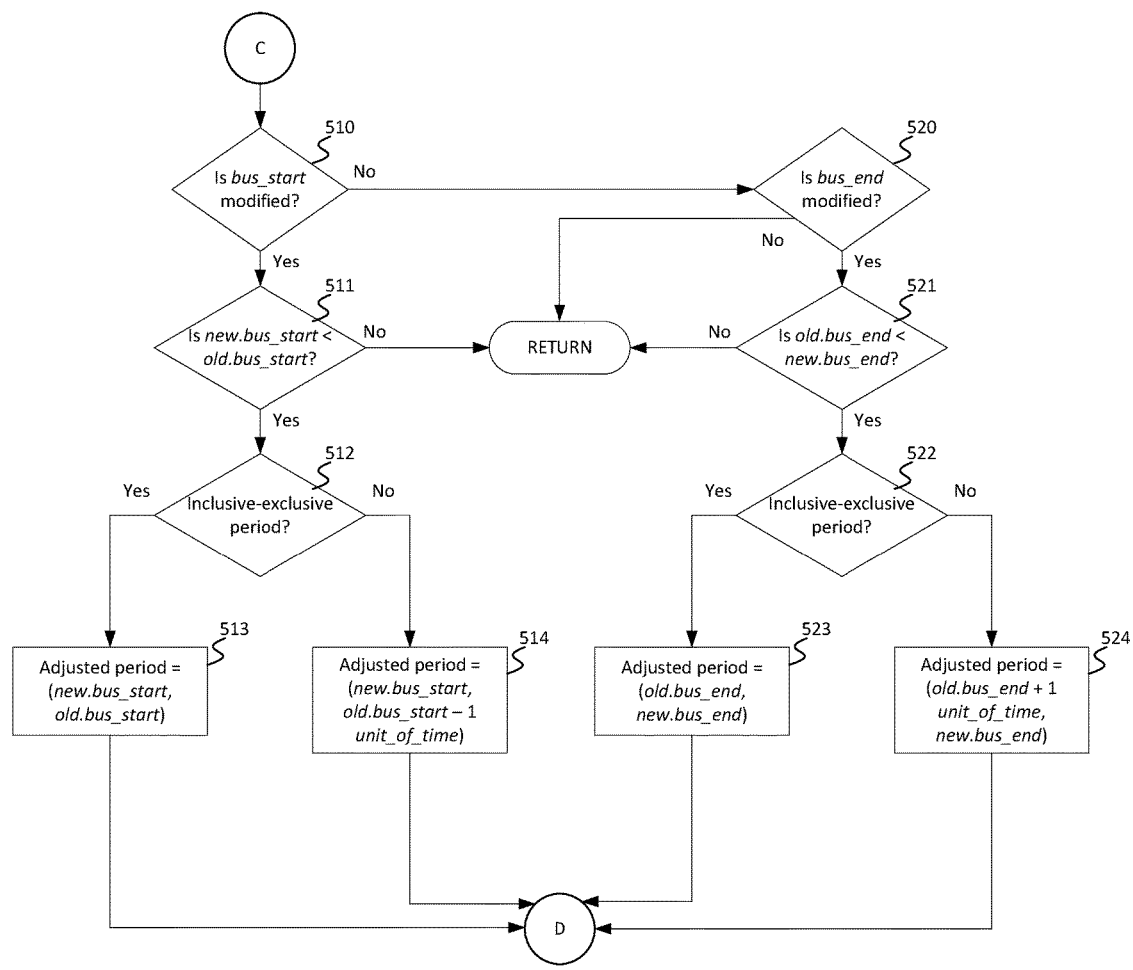

FIG. 5B illustrates the adjustment of the child business time period according to embodiments of the present invention. When the start time (bus_start) of the child business time period is modified (510), and the new start time (new.bus_start) is earlier than the original start time (old.bus_start) (511), the database system determines whether the inclusive-exclusive semantic model is used (512). When the inclusive-exclusive semantic model is used, the adjusted child business time period is set to (new.bus_start, old.bus_start) (513). Otherwise, the adjusted child business time period is set to (new.bus_start, old.bus_start−1 unit_of_time) (514). When the end time (bus end) of the child business time period is modified (520), and the original end time (old.bus_end) is earlier than the new end time (new.bus_end) (521), the database system determines whether the inclusive-exclusive semantic model is used (522). When the inclusive-exclusive semantic model is used, the adjusted child business time period is set to (old.bus_end, new.bus_end) (523). Otherwise, the adjusted child business time period is set to (old.bus_end+1 unit_of_time, new.bus_end) (524).

Returning to FIG. 5A, using the adjusted child business time period, the database system checks the primary key index for a match to the new foreign key value and checks for gaps in the parent business time period (503). If the key values match and no gaps are found (504), then the UPDATE satisfies the temporal referential constraint (505). Otherwise, the UPDATE violates the temporal referential constraint (506), and the database system fails the UPDATE operation.

Returning to FIG. 4, when the target table is a parent table in a temporal referential constraint, the database system determines whether the parent key value is changed by the UPDATE operation (420). If the parent key value is not changed, then temporal referential integrity checking is not required. If the parent key value is changed, then the database system determines whether a single parent row is changed (421). If multiple parent rows are changed, then the temporal referential integrity checking is deferred until the end of the update (422). In this illustrative embodiment, the original parent keys are saved in a work file, and the deferred temporal referential constraint checking is done at the end of the update to avoid unnecessary early abortion of the UPDATE statement. When a single parent row is changed (421), the database system determines whether the parent non-period key value is changed (423). If the parent non-period key value is changed, then the database systems checks the foreign key index for a match to the original parent key value (424). If a match is not found (425), then the UPDATE satisfies the temporal referential constraint (426). Otherwise, the UPDATE violates the temporal referential constraint (427), and the database system fails the UPDATE operation.

If the parent non-period key value is not changed (423), then the parent period key value must be modified by the UPDATE operation. Referring to FIG. 6A, the parent business time period can be modified to be shorter or longer. When the database system determines that parent business time period is not modified to be shorter (601), then temporal referential integrity checking is not required, since the new parent business time period will cover the child business time period without gaps. When the parent business time period is modified to be shorter (601), then temporal referential integrity checking is required, since there is a possibility that the new parent business time period will not cover the child business time period without gaps. To perform the temporal referential integrity checking, in this illustrative embodiment, the database system first adjusts the parent business time periods based on the semantics model used (602).

Figure 6B:
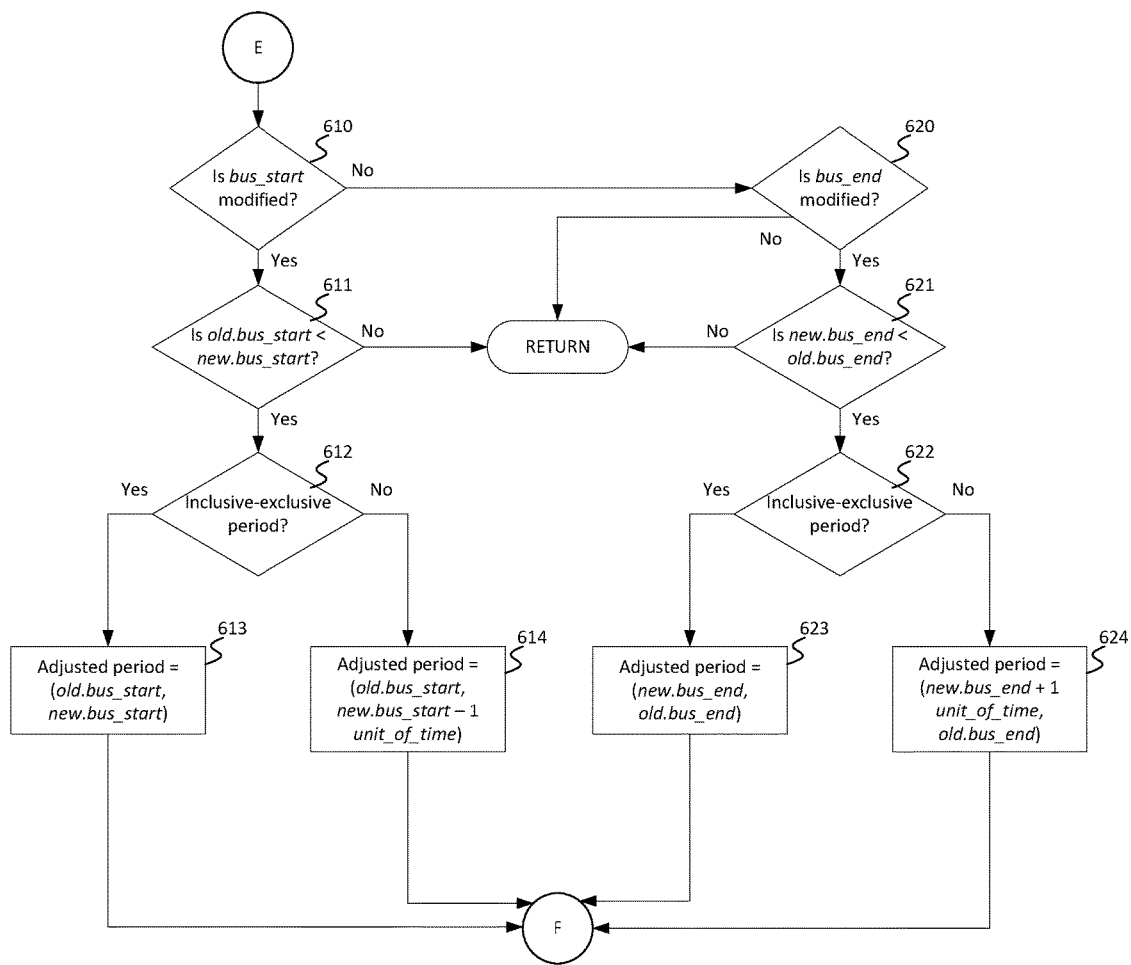

FIG. 6B illustrates the adjustment of the parent business time period according to embodiments of the present invention. When the start time (bus_start) of the parent business time period is modified (610), and the original start time (old.bus_start) is earlier than the new start time (new.bus_start) (611), the database system determines whether the inclusive-exclusive semantic model is used (612). When the inclusive-exclusive semantic model is used, the adjusted parent business time period is set to (old.bus_start, new.bus_start) (613). Otherwise, the adjusted parent business time period is set to (old.bus_start, new.bus_start−1 unit_of_time) (614). When the end time (bus_end) of the parent business time period is modified (620), and the new end time (new.bus_end) is earlier than the original end time (old.bus_end) (621), the database system determines whether the inclusive-exclusive semantic model is used (622). When the inclusive-exclusive semantic model is used, the adjusted parent business time period is set to (new.bus_end, old.bus_end) (623). Otherwise, the adjusted parent business time period is set to (new.bus_end+1 unit_of_time, old.bus_end) (624).

Returning to FIG. 6A, using the adjusted parent business time period, the database system checks the foreign key index for a match to the primary key value (603). If the key values do not match (604), then the UPDATE satisfies the temporal referential constraint (605). Otherwise, the UPDATE violates the temporal referential constraint (606), and the database system fails the UPDATE operation.

Figure 7:
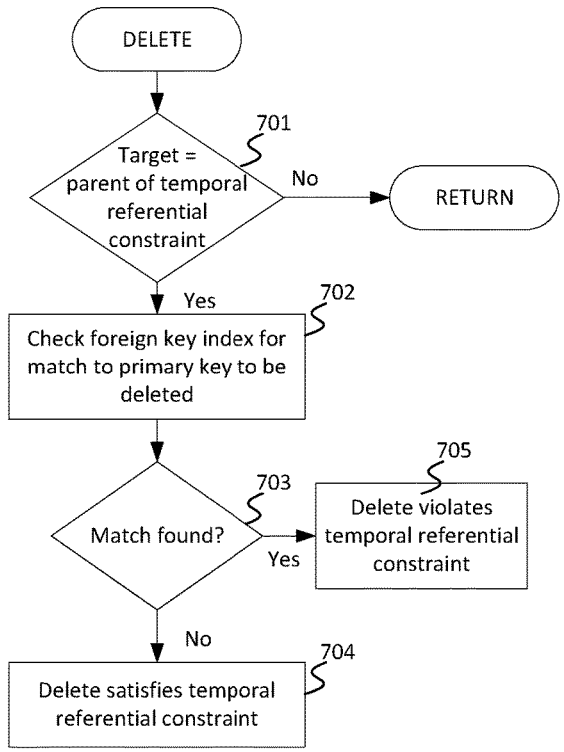
FIG. 7 illustrates an embodiment of the enforcement of temporal referential integrity for a DELETE operation according to the present invention.

FIG. 7 illustrates an embodiment of the enforcement of temporal referential integrity for a DELETE operation according to the present invention. When the change request is a DELETE operation and the target table is a parent table of a temporal referential constraint (701), the database system checks the foreign key index for a match to the primary key to be deleted (702). If no match is found, i.e., no dependent child table row is found (703), then the DELETE operation satisfies the temporal referential constraint (704). If a dependent child table row is found, then the DELETE operation violates the temporal referential constraint (705), and the database system fails the DELETE operation. In this illustrative embodiment, the delete rule is set to RESTRICT, where if the base table is a parent table, the rows selected for deletion must not have any dependents. However, alternative embodiments may extend the present invention described herein to other delete rules, e.g., NO ACTION, CASCADE, and SET NULL.

For example, assume that three contiguous parent table rows contain inclusive-exclusive periods p1(start time=2, end time=8), p2(8,16), and p3(16, 24). The parent business time period is thus from start time=2 to end time=24 with no gaps. Assume also that there is one child row with inclusive-exclusive period c1(6, 20). In a first example case, with reference to FIG. 5A, an UPDATE is received to change the child business time period to be longer (501), from c1(6, 20) to c1'(1, 20). Since the inclusive-exclusive semantic model is used, the child business time period is adjusted to (1, 6) (513, FIG. 5B). When the primary key index and gaps are checked (503), the database system determines that the business time periods of the parent table rows do not cover the adjusted child business time period (504). Thus, the update violates the temporal referential constraint (506), and the update operation fails.

In a second example case, with referenced to FIG. 5A, an UPDATE is received to change the child business time period to be longer (501), from c1(6, 20) to c1'(4, 20). Since the inclusive-exclusive model is used, the child business time period is adjusted to (4,6) (513, FIG. 5B). When the primary key index and gaps are checked (503), the database system determines that the business time periods of the parent table rows cover the adjusted child business time period (504), thus, the temporal referential constraint is satisfied (505).

In a third example case, with referenced to FIG. 6A, an UPDATE is received to change the parent business time period p2 to be shorter (601), from p2(8,16) to p2'(10,16). This is similar to a deletion of a parent table row with period (8, 10). Since the inclusive-exclusive model is used, the parent business time period is adjusted to (8, 10) (613, FIG. 6B). When the foreign key index is checked (603), the child table row with period c1(6, 20) is found. However, for the child business time period c1(6, 20), the database system determines that a gap exists in the new parent business time periods between p1(2,8) and p2'(10, 16). The update thus violates the temporal referential constraint (606), and the database system fails the update operation.

In a fourth example case, with referenced to FIGS. 6A and 6B, an UPDATE is received to change the parent business time period p1 to be shorter, from p1(2, 8) to p1'(4,7). This is similar to deletions of parent table rows with adjusted periods p1'(2, 4) (613) and p1'(7, 8) (623). When the foreign key index is checked for p1'(2, 4) (603), no match is found (604) and thus the update satisfies the temporal referential integrity (605). The foreign key index is checked again for the second portion p1'(7, 8) of the parent business time period (603). The update operation is failed since the second portion p1'(7, 8) violates the temporal referential integrity (606).

In a fifth example case, with referenced to FIG. 6A, an UPDATE is received to change the parent business time period from p1'(2, 8) to p1'(4, 8). This is similar to a deletion of a parent table row with p1'(2, 4). When the foreign key index is checked (603), no child row with matching key is found (604). Thus, the update satisfies temporal referential constraints (605).

Figure 8:
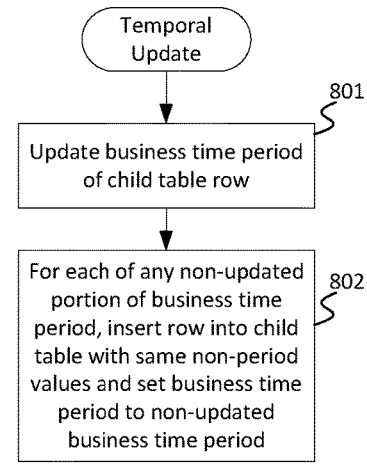
FIG. 8 illustrates an embodiment of the enforcement of temporal referential integrity for a temporal update against a child table row according to the present invention.
Figure 9:
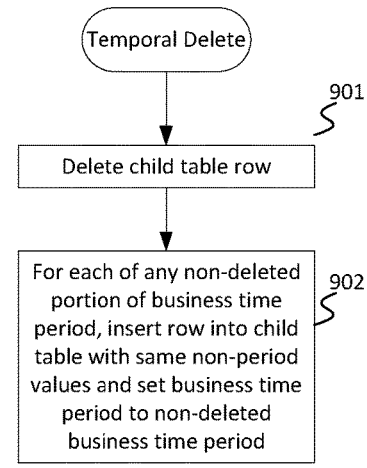
FIG. 9 illustrates an embodiment of the enforcement of temporal referential integrity for a temporal delete against a child table row according to the present invention.
Figures 10, 11:
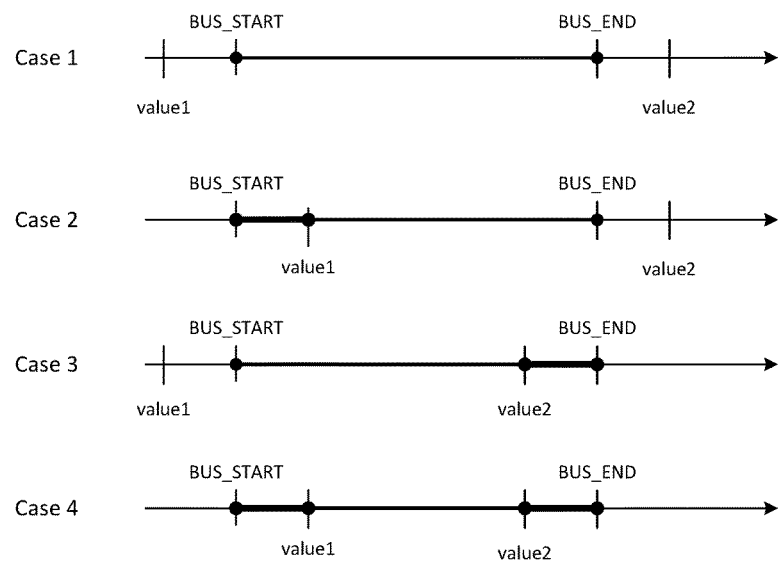
FIG. 10 illustrates an example of a temporal update of a portion of the business time period in a child table row.
FIG. 11 illustrates examples of temporal deletes of a portion of the business time period in a child table row.

FIGS. 8-9 illustrate two special cases in the enforcement of temporal referential integrity, a temporal update and a temporal delete, respectively, against a child table row. FIG. 8 illustrates an embodiment of the enforcement of temporal referential integrity for a temporal update against a child table row according to the present invention. When a period clause of an UPDATE specifies that the update applies to child table row values only for a portion of the business time period in the row, the database system updates the business time period of the child table row (801). In addition, for each of any non-updated portion of the business time period, the database system inserts a row into the child table with the same non-period values and sets the business time period to the non-updated business time period (802). When the business time period is of the inclusive-inclusive model, the database system adjusts the period boundary of the inserted row(s) by one unit of time, as described above. FIG. 10 illustrates an example of a temporal update of a portion of the business time period in a child table row. In this example, assume that a parent table ('dept') 1001 and a child table ('emp') 1002 exists. Assume that the following UPDATE statement is received:

```
UPDATE emp
FOR PORTION OF BUSINESS_TIME
FROM '2011-07-01' TO '2011-08-01'
SET EDept = 3
WHERE EDept = 4;
```

The business time period (2011-06-03, 2011-11-12) of the child table row 1004 (with EDept=4) fully overlaps the specified period from 2011-07-01 to 2011-08-01. The child table row 1004 is updated to the modified row 1005. The value of the begin column (EStart) is set to 2011-07-01 and the value of the end column (EEnd) is set to 2011-08-01 (801). An additional row 1006 is inserted into the child table 1003 using the original values from the row, except the end column is set to 2011-07-01 (802). Another additional row 1007 is inserted into the child table 1003 using the original values from the row, except the begin column is set to 2011-08-01 (802). In this manner, the update occurs only for the specified portion of the business time period, from 2011-07-01 to 2011-08-01. The enforcement of temporal referential integrity is then performed as described above for both the updated row 1005 and the inserted rows 1006-1007.

FIG. 9 illustrates an embodiment of the enforcement of temporal referential integrity for a temporal delete against a child table row according to the present invention. When a period clause of a DELETE specifies that the delete applies to child table row values only for a portion of the business time period in the row, the database system deletes the child table row (901). In addition, for each of any non-deleted portion of the business time period, the database system inserts a row into the child table with the same non-period values and sets the business time period to the non-deleted business time period (902). When the business time period is of the inclusive-inclusive model, the database system adjusts the period boundary of the inserted row(s) by one unit of time, as described above. FIG. 11 illustrates examples of temporal deletes of a portion of the business time period in a child table row. In these examples, assume that a child table row exists with a business time period with start time=BUS_START and end time=BUS_END. Assume that the following DELETE statement is received:

```
DELETE FROM emp
FOR PORTION OF BUSINESS_TIME
FROM value1 TO value2
WHERE EDept = ...;
```

In Case 1, value1 is earlier than BUS_START, and value2 is later than BUS_END. The DELETE thus applies to the entire child business time period, and the entire child table row is deleted (901) with no inserts (902). The enforcement of temporal referential integrity is then performed as described above for the deleted rows.

In Case 2, value1 is later than BUS_START, and value2 is later than BUS_END. The database system deletes the child table row (901). For the non-deleted business time period portion between BUS_START and value1, the database system inserts a row into the child table with the same non-period values and with the business time period start time=BUS_START and the end time=value1 (902). The enforcement of temporal referential integrity is then performed as described above for the deleted and inserted rows.

In Case 3, value1 is earlier than BUS_START, and value2 is earlier than BUS_END. The database system deletes the child table row (901). For the non-deleted business time period portion between value2 and BUS_END, the database system inserts a row into the child table with the same non-period values and with business time period start time=value2 and end time=BUS_END (902). The enforcement of temporal referential integrity is then performed as described above for the deleted and inserted rows.

In Case 4, value1 is later than BUS_START and value2 is earlier than BUS_END. The database system deletes the child table row (901). For the first non-deleted business time period portion between BUS_START and value1, the database system inserts a first row into the child table with the same non-period values and with the business time period start time=BUS_START and end time=value1 (902). For the second non-deleted business time period portion between value2 and BUS_END, the database system inserts a second row into the child table with the same non-period values and with the business time period start time=value2 and end time=BUS_END. The enforcement of temporal referential integrity is then performed as described above for the deleted and inserted rows.

Figure 12:
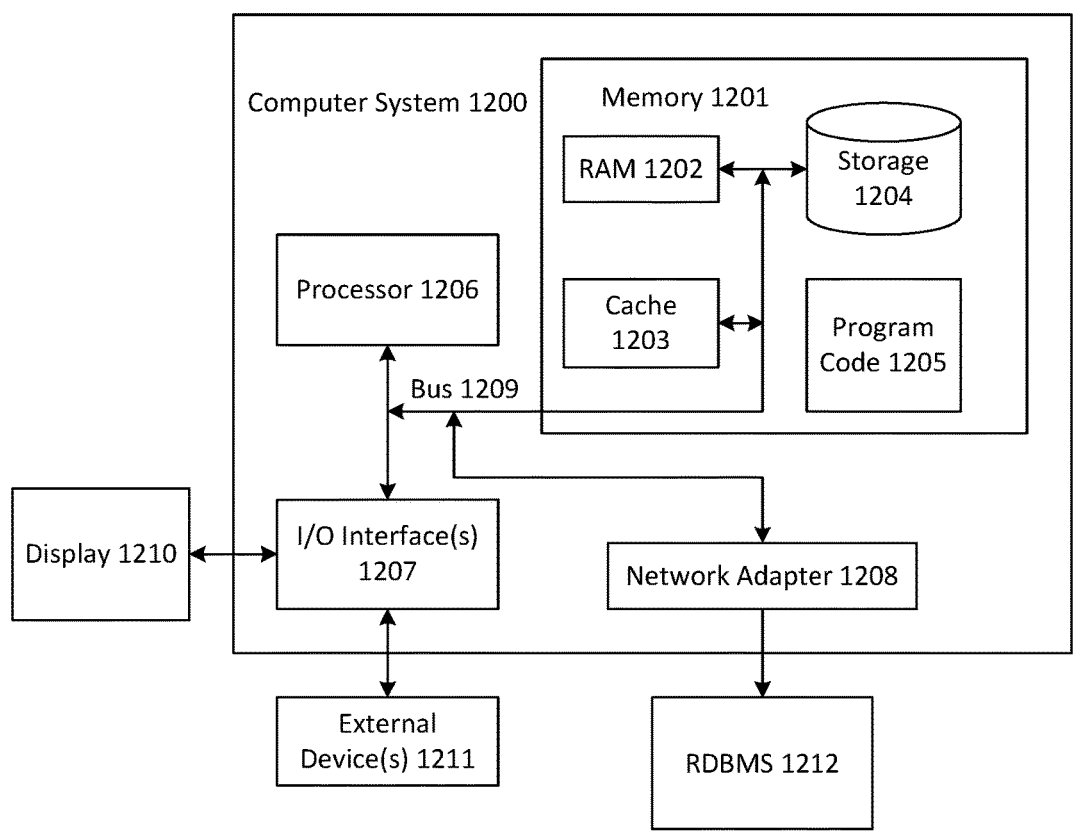
FIG. 12 illustrates a system for enforcing temporal referential integrity according to embodiments of the present invention.

FIG. 12 illustrates a system for enforcing temporal referential integrity according to embodiments of the present invention. The computer system 1200 is operationally coupled to a processor or processing units 1206, a memory 1201, and a bus 1209 that couples various system components, including the memory 1201 to the processor 1206. The bus 1209 represents one or more of any of several types of bus structure, including a memory bus or memory controller, a peripheral bus, an accelerated graphics port, and a processor or local bus using any of a variety of bus architectures. The memory 1201 may include computer readable media in the form of volatile memory, such as random access memory (RAM) 1202 or cache memory 1203, or non-volatile storage media 1204. The memory 1201 may include at least one program product having a set of at least one program code module 1205 that are configured to carry out the functions of embodiment of the present invention when executed by the processor 1206. The computer system 1200 may also communicate with one or more external devices 1211, such as a display 1210, via I/O interfaces 1207. The computer system 1200 may communicate with one or more networks via network adapter 1208.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for enforcement of temporal referential integrity, the computer program product comprising a computer readable storage medium having program instructions embodied therewith, the program instructions executable by a processor to cause the processor to:
    define temporal referential constraints between a parent table and a child table in a database system using data definition language;
    create a parent key index for the parent table, the parent key index being a unique index with last two columns being an end time column and a begin time column of a parent business time period;
    create a child key index for the child table, the child key index being a non-unique index with last two columns being an end time column and a begin time column of the child business time period;
    receive a change request for one or more rows in a target table in the database system;
    determine, by the database system, that the target table comprises temporal referential constraints with a second table, the target table being either the child table or the parent table of the second table;
    using the parent key index or the child key index, compare, by the database system, a non-period child key value in one or more child table rows with a non-period parent key value in one or more parent table rows;
    using the parent key index or the child key index, compare, by the database system, a child business time period key value in the one or more child table rows with a parent business time period key value in the one or more parent table rows; and
    when the non-period child key value matches the non-period parent key value and when the child business time period key value is within the parent business time period key value, determine, by the database system, that the change request satisfies the temporal referential constraints, wherein otherwise determine that the change request violates the temporal referential constraints.

2. The computer program product of claim 1, wherein the change request comprises an insert of one or more rows into the child table,
    wherein the compare of the non-period child key value in the one or more child table rows with the non-period parent key value in the one or more parent table rows, and the compare of the child business time period key value in the one or more child table rows with the parent business time period key value in the one or more parent table rows, comprise:

check the primary key index and compare a non-period foreign key value of the one or more child table rows to be inserted with non-period primary key value of the one or more parent table rows; and compare a child business time period key value of the one or more child table rows to be inserted with the parent business time key value, wherein the determine that the change request satisfies the temporal referential constraints, comprises:

when the non-period foreign key value of the one or more child table rows to be inserted matches the non-period primary key value of the one or more parent table rows and when the child business time period key value of the one or more child table rows to be inserted is within the parent business time period key value, determine that the insert satisfies the temporal referential constraints, wherein otherwise determine that the insert violates the temporal referential constraints.

3. The computer program product of claim 1, wherein the change request comprises an update of one or more rows in the child table, wherein the compare of the non-period child key value in the one or more child table rows with the non-period parent key value in the parent table rows, and the compare of the child business time period key value in the one or more child table rows with the parent business time period key value in the one or more parent table rows, comprise:

determine that a non-period key value of the one or more child table rows is changed; and in response to determining that the non-period key value of the one or more child table rows is changed, check a primary key index for the one or more parent table rows for a match to a new foreign key for the updated child table rows, and check for at least one gap in the parent business time period, wherein the determine that the change request satisfies the temporal referential constraints, comprises:

when the primary key for the one or more parent table rows matches the new foreign key for the changed child table rows and when no gaps are found in the parent business time period, determine that the update satisfies the temporal referential constraints, wherein otherwise determine that the update violates the temporal referential constraints.

4. The computer program product of claim 1, wherein the change request comprises an update of one or more rows in the parent table, wherein the compare of the non-period child key value in the one or more child table rows with the non-period parent key value in the one or more parent table rows, and the compare of the child business time period key value in the one or more child table rows with the parent business time period key value in the one or more parent table rows, comprise:

determine that a non-period key value of the one or more parent table rows is changed; and in response to determining that the non-period key value of the one or more parent table rows is changed, check a foreign key index for the one or more child table rows for a match to a primary key for the one or more parent table rows prior to the change, wherein the determine that the change request satisfies the temporal referential constraints, comprises:

when the foreign key for the one or more child table rows do not match the primary key for the one or more parent table rows prior to the update, determine that the update satisfies the temporal referential constraints, wherein otherwise determine that the update violates the temporal referential constraints.

5. The computer program product of claim 1, wherein the change request comprises a delete of one or more rows in the parent table, wherein the compare of the non-period child key value in the one or more child table rows with the non-period parent key value in the one or more parent table rows, and the compare of the child business time period key value in the one or more child table rows with the parent business time period key value in the one or more parent table rows, comprise:

check a foreign key index for the one or more child table rows for a match to a primary key for the one or more parent table rows to be deleted, wherein the determine that the change request satisfies the temporal referential constraints, comprises:

when the foreign key for the one or more child table rows matching the primary key for the one or more parent table rows to be deleted is found, determine that the delete violates the temporal referential constraints, wherein otherwise determine that the delete satisfies the temporal referential constraints.

6. A system, comprising:

a processor; and a computer readable storage medium having program instructions embodied therewith, the program instructions executable by the processor to cause the processor to:

define temporal referential constraints between a parent table and a child table in a database system using data definition language;

create a parent key index for the parent table, the parent key index being a unique index with last two columns being an end time column and a begin time column of a parent business time period;

create a child key index for the child table, the child key index being a non-unique index with last two columns being an end time column and a begin time column of the child business time period;

receive a change request for one or more rows in a target table in the database system;

determine, by the database system, that the target table comprises temporal referential constraints with a second table, the target table being either the child table or the parent table of the second table;

using the parent key index or the child key index, compare, by the database system, a non-period child key value in one or more child table rows with a non-period parent key value in one or more parent table rows;

using the parent key index or the child key index, compare, by the database system, a child business time period key value in the one or more child table rows with a parent business time period key value in the one or more parent table rows; and when the non-period child key value matches the non-period parent key value and when the child business time period key value is within the parent business time period key value, determine, by the database system, that the change request satisfies the temporal referential constraints, wherein otherwise determine that the change request violates the temporal referential constraints.

7. The system of claim 6, wherein the change request comprises an insert of one or more rows into the child table,
wherein the compare of the non-period child key value in the one or more child table rows with the non-period parent key value in the one or more parent table rows, and the compare of the child business time period key value in the one or more child table rows with the parent business time period key value in the one or more parent table rows, comprise:
check the primary key index and compare a non-period foreign key value of the one or more child table rows to be inserted with non-period primary key value of the one or more parent table rows; and
compare a child business time period key value of the one or more child table rows to be inserted with the parent business key value,
wherein the determine that the change request satisfies the temporal referential constraints, comprises:
when the non-period foreign key value of the one or more child table rows to be inserted matches the non-period primary key value of the one or more parent table rows and when the child business time period key value of the one or more child table rows to be inserted is within the parent business time period key value, determine that the insert satisfies the temporal referential constraints, wherein otherwise determine that the insert violates the temporal referential constraints.

8. The system of claim 6, wherein the change request comprises an update of one or more rows in the child table,
wherein the compare of the non-period child key value in the one or more child table rows with the non-period parent key value in the parent table rows, and the compare of the child business time period key value in the one or more child table rows with the parent business time period key value in the one or more parent table rows, comprise:
determine that a non-period key value of the one or more child table rows is changed; and
in response to determining that the non-period key value of the one or more child table rows is changed, check a primary key index for the one or more parent table rows for a match to a new foreign key for the updated child table rows, and check for at least one gap in the parent business time period,
wherein the determine that the change request satisfies the temporal referential constraints, comprises:
when the primary key for the one or more parent table rows matches the new foreign key for the changed child table rows and when no gaps are found in the parent business time period, determine that the update satisfies the temporal referential constraints, wherein otherwise determine that the update violates the temporal referential constraints.

9. The system of claim 6, wherein the change request comprises an update of one or more rows in the parent table,
wherein the compare of the non-period child key value in the one or more child table rows with the non-period parent key value in the one or more parent table rows, and the compare of the child business time period key value in the one or more child table rows with the parent business time period key value in the one or more parent table rows, comprise:
determine that a non-period key value of the one or more parent table rows is changed; and
in response to determining that the non-period key value of the one or more parent table rows is changed, check a foreign key index for the one or more child table rows for a match to a primary key for the one or more parent table rows prior to the change,
wherein the determine that the change request satisfies the temporal referential constraints, comprises:
when the foreign key for the one or more child table rows do not match the primary key for the one or more parent table rows prior to the update, determine that the update satisfies the temporal referential constraints, wherein otherwise determine that the update violates the temporal referential constraints.

10. The system of claim 6, wherein the change request comprises a delete of one or more rows in the parent table,
wherein the compare of the non-period child key value in the one or more child table rows with the non-period parent key value in the one or more parent table rows, and the compare of the child business time period key value in the one or more child table rows with the parent business time period key value in the one or more parent table rows, comprise:
check a foreign key index for the one or more child table rows for a match to a primary key for the one or more parent table rows to be deleted,
wherein the determine that the change request satisfies the temporal referential constraints, comprises:
when the foreign key for the one or more child table rows matching the primary key for the one or more parent table rows to be deleted is found, determine that the delete violates the temporal referential constraints, wherein otherwise determine that the delete satisfies the temporal referential constraints.

* * * * *